Patented May 20, 1952

2,597,834

UNITED STATES PATENT OFFICE 2,597,834

SULFONATED PHENYL ALKANE DETERGENTS AND PROCESS OF PRODUCING SAME

William H. Claussen, Berkeley, Calif., assignor to California Research Corporation, San Francisco, Calif., a corporation of Delaware No Drawing. Application October 18, 1947, Serial No. 780,751

7 Claims. (Cl. 260—505)

This invention relates to methods of producing sulfonated phenyl alkanes useful as surface active agents and particularly as wetting agents and detergents. The invention also relates to the products of the process or detergents produced. More particularly, the invention is concerned with the production of such compounds in an especially efficient and economical manner from the olefinic materials which are present in cracked petroleum fractions, and especially in a manner which not only accomplishes this but also yields a product having a significant and improved property for application as a wetting agent or detergent.

In the production of sulfonate detergents and particularly their relatively high molecular weight phenyl alkane components by alkylation or condensation reactions, a paramount problem has been the provision of a suitable alkene. Olefins such as butene polymers have been proposed as an alkene source, but introduce outstanding difficulties which arise from instability of the branched-aliphatic chains characteristic of such polymers. Straight chain olefins are of limited availability and prohibitive in cost. The instability of branched aliphatic polymer chains is reflected, for example, in alkylation and condensation reactions with benzene or toluene and results in degradation of the polymer chain during condensation. This degradation leads to the production of a mixture of phenyl alkanes containing compounds both lower and higher in aliphatic molecular weight than the olefin originally selected and desired. The instability and degradation of such olefin polymers in the presence of condensation catalysts under alkylating conditions also leads to the production of substantially inseparable polyalkylated aromatics of the same molecular weight and boiling range as the desired phenyl alkane. This is a decided disadvantage since, upon conversion to the sulfonated phenyl derivatives, relatively low yields have resulted. The sulfonated derivatives tend to be relatively poor in detergent quality and require costly purification treatment to eliminate or reduce odor, unsulfonatable residue, color bodies and other impurities introduced by degradation caused by the original instability of the olefin polymer used.

For many years olefinic hydrocarbons of suitable molecular weight for the production of sulfonated phenyl alkane detergents have been available from the cracking, generally by thermal, but more recently by catalytic processes, of petroleum hydrocarbons. The exact chemical nature of these olefinic hydrocarbons is not known. Their structures vary with type of saturated hydrocarbon subjected to the cracking operation, and with the conditions under which the cracking operation is carried out. Especially in the case where the saturated or substantially saturated petroleum fraction subjected to the cracking operation contains a high concentration of naphthenic and aromatic hydrocarbons the olefinic hydrocarbons resulting appear to be very complex mixtures of different types of compounds.

Such olefinic materials have long been considered a desirable source of the alkane portion of sulfonated phenyl alkane detergents because of their low cost and availability in large volume. However, attempts to develop methods of producing such detergents from such olefinic hydrocarbons have not been successful commercially because these olefinic mixtures also introduce outstanding difficulties which arise from instability of some of their components in alkylation or condensation reactions. As in the case of olefins such as butene polymers, these olefins from cracked petroleum fractions, and particularly those of naphthenic type, when subjected to alkylation or condensation conditions in order to accomplish alkylation or condensation with aromatic hydrocarbons such as benzene or toluene, suffer degradation or fragmentation in such a manner that the yield of mono-phenyl alkane having the same alkane molecular weight as the olefin used, that is, the product which is desired for the manufacture of sulfonated phenyl alkane detergents, is very substantially lowered. The fragments which result from this degradation appear to react with the aromatic hydrocarbons forming phenyl alkanes of undesirably low molecular weight or polyalkylated aromatics which are inseparable by distillation from the desired phenyl alkane, and which, because of their undesirable chemical structure, introduce difficulties in the subsequent sulfonation step, even lowering sulfonation yields, and further cause the sulfonated products to have poor color and odor, and lowered efficiency as detergents. The portion of the olefinic material which suffers this degradation thus occupies an appreciable volume of reactors being used to produce the desired type of phenyl alkane and this thereby limits the capacity of these reactors. Further, by reacting with the aromatic hydrocarbon to form a by-product of low value, the consumption of the aromatic hydrocarbon required to produce the desired phenyl alkane is greatly increased, and therefore the cost of the operation is increased.

It has now been found that not all of the olefinic material in these olefinic mixtures derived by cracking of petroleum fractions is of the type which degrades in alkylation or condensation reactions, and that by the use of a separation procedure known as adsorption the undesirable portion of the olefinic material which is unstable under these conditions can be separated from the desirable portion which is substantially resistant to degradation under alkylation and condensation conditions. After this removal of the unstable olefinic constituents, the remainder of the olefins can then be used to alkylate an aromatic hydrocarbon, such as benzene, to produce the desired type of phenyl alkanes in an economical manner, and especially without an excessive and wasteful consumption of the aromatic hydrocarbon. These phenyl alkanes, when subjected to the action of a sulfonating agent, such as fuming sulfuric acid, form sulfonated phenyl alkanes which are light in color, free of objectionable odors, and more efficient as detergents and as wetting agents, than sulfonated phenyl alkanes prepared from the original olefinic material without removal of the unstable portion by means of the silica gel adsorption process.

It is one object of this invention to produce an improved mixture of sulfonated phenyl-substituted alkanes of relatively high molecular weight and excellent detergency.

A further object is the production of a mixture of phenyl alkanes having a low unsulfonatable residue from the olefinic constituents of cracked petroleum fractions.

Another object of the invention is to furnish phenyl alkanes convertible to sulfonated-phenyl alkane detergents of good color and having an exceptionally low content of deleterious degradation products or impurities.

A further object is to provide an economical and efficient process for the production of sulfonated phenyl alkanes of high quality and having valuable detergent properties from the olefinic constituents of cracked petroleum fractions.

Other objects and advantages of the product and process of the present invention will become apparent from the following description of a preferred example of the invention.

In order to produce an efficient sulfonated phenyl alkane surface active agent useful as a detergent and wetting agent, it is necessary to select the alkane portion in such a manner that its hydrophobic character will be sufficient to counterbalance the hydrophilic character of the sulfonate grouping to the proper degree. In order to obtain in the product the desired properties, the alkane portion of the molecule should not contain too few or too many carbon atoms. In general, the alkane portion of the molecule should not contain less than 8 carbon atoms nor more than 20 carbon atoms, and it is preferable to restrict this variation to a narrower range, such as between 12 and 15 carbon atoms, in order to produce materials of the highest efficiency. This balance between the hydrophobic and hydrophilic character is conveniently determined in the case of sulfonated phenyl alkanes derived from olefinic materials by the boiling range of the olefinic material. In the case of olefinic materials derived from cracked petroleum fractions, a hydrocarbon fraction boiling between 300° F. and 600° F. at atmospheric pressure is utilized where it is desired to produce products the alkane portion of which contains between 8 and 20 carbon atoms. It is desirable to use a hydrocarbon fraction of cracked petroleum boiling between 350° F. and 500° F. at atmospheric pressure. About 95% of the olefinic materials in such a hydrocarbon fraction will contain between 12 and 15 carbon atoms.

In selecting an olefinic material for the production of a sulfonated phenyl alkane detergent, it is obviously not necessary that the olefinic material be composed entirely of olefins. Cracked petroleum fractions of the desired boiling range will generally contain from 20% to 50% of olefin hydrocarbons. The balance of the hydrocarbon mixture is generally composed of aliphatic and cyclo-aliphatic hydrocarbons. When these are subjected to the action of alkylation or condensation catalysts, they remain substantially unchanged or they may undergo to some extent isomerization reactions. Such changes as may occur in the arrangement of the carbon atom skeletons of this type of molecule under the influence of alkylation or condensation catalysts and conditions do not result in significant increase in the molecular weight or boiling range of these materials and they are, therefore, readily separable by distillation from the desired phenyl alkanes which result from the reaction between the stable olefin constituents and the aromatic hydrocarbon being used.

Adsorbents such as silica gel, silica-alumina, charcoal and the like possess the properties of adsorbing many types of chemical compounds and thereby removing them from solutions or substantially decreasing their concentrations in a solution. Compounds will be adsorbed to different degrees, depending upon their chemical structure and the polarity which results from their structure and composition. It is therefore possible, even with compounds with relatively small differences in polarity such as hydrocarbons, to effect separations of mixtures into their constituents or into groups of constituents having similar polarities and hence similar chemical structures. Such an adsorption separation may be effected by passing the mixture of hydrocarbons through a column packed with silica gel particles of suitable size and collecting the hydrocarbon into fractions. It is then found that the first fractions coming from the column contain high concentrations of the least polar constituents of the mixture being treated, for the more polar constituents are preferentially adsorbed. Then fractions containing still more polar constituents appear as these are displaced from the silica gel surface by the still more polar constituents of the mixture. Toward the end the most polar constituents are displaced from the adsorbent by passing through the column another suitable material which is more highly adsorbed.

In the desired separation, the first portion coming through the column, say, for example, the first 30%, will be sufficiently free of olefinic material as to possess a substantially zero bromine number, and it is therefore desirable to reject this portion from the material to be treated. After about 30% of the material has passed through the column, the bromine number of the succeeding portions rapidly rises while the next approximately 30% of the material is withdrawn from the column. The bromine number of the succeeding fractions which are withdrawn from the column thereafter rapidly diminishes, while at the same time the aniline point and the gravity of the succeeding fractions likewise rapidly diminish. The sharp drop in the aniline point and gravity of the succeeding fractions indicates a change in the character of the olefinic materials separated beyond this point. They are probably complex mixtures containing cyclic and aromatic structures as well as olefinic double bonds. Part or all of the materials passing from the column after the bromine number of the material treated has passed its maximum and rapid declines in the aniline point and gravity appear are rejected from the product of the silica gel treatment which is to be used in accordance with the process of this invention. By this procedure about one-third of the cracked naphtha is separated from the remainder for treatment in accordance with the process of this invention. The first portion coming through the column is rejected for the reason that it does not contain any or sufficient olefinic material for the purpose in question, while the latter portion is rejected as including materials which, under the influence of alkylation or condensation catalysts and conditions, exhibit instability and degradation.

There is thus separated an intermediate portion of the material passing through the silica gel column amounting to about 30% of the cracked hydrocarbon fractions processed for further treatment by the process of the present invention. This olefin-containing fraction is then employed for alkylation of benzene which may be accomplished in any well-known process for alkylating benzene by olefinic material. In general, this is accomplished by means of the Friedel-Crafts type of condensation catalysts, such as $AlCl_3$, $H_2SO_4$, HF, $BF_3$, or mixtures of $BF_3$ and HF, a particularly effective and convenient catalyst being hydrogen fluoride.

The phenyl alkanes produced are then sulfonated in any preferred or usual manner by reaction with sulfuric acid, after which the reaction mixture is neutralized to form a mixture of sodium sulfonates and sodium sulfate. There is thus produced the desired product or detergent.

The following preferred example of a process embodying the invention is given and contrasted with a similar treatment in which the entire cracked naphtha stock was processed in order to illustrate the advantages of the present invention.

In this example of the invention a fraction from thermally cracked naphtha boiling between 350° F. and 500° F. was chosen, although as before indicated, the process may be applied to fractions boiling between 300° F. and 600° F. or various other fractions included within the above range. Such fractions of cracked naphtha will contain between 20% and 50% unsaturates as determined by the bromine procedure. More commonly, they contain between 30% and 40% unsaturates, and in the case of the particular sample selected for treatment, the olefinic content was 34%. Twelve liters of this cracked naphtha was subjected to a silica gel separation by passing the material through a 6-inch by 10-foot steel column containing 28 to 200 mesh silica gel. As the fractions emerged from the column, they were collected and segregated and physical and chemical tests, such as aniline point, API gravity, and bromine number were obtained on each in order to follow the changes in composition. Tests on the first 3.6 liters of the material passing through the column, or the first 30% of the material, showed a substantial zero bromine number, after which the bromine number rose rapidly to reach a maximum value of 68.50 at 7 liters. Thereafter, the bromine number dropped rapidly until at 11 liters the bromine number had fallen to 23. The aniline point of the material first coming through the column was 161° F. It remained somewhat constant at about 160° F. to 161° F. until the first 3.6 liters or 30% of the material had passed through the column, after which the aniline point of the material coming through the column decreased slowly until at 6.8 liters the aniline point had dropped to 130° F. Thereafter, the aniline point dropped rapidly so that at 11 liters the aniline point of the material coming through the column had dropped to −58° F. The gravity of the material first coming through the column was 45.8° API. It decreased but slowly, so that at 3.6 liters the material passing from the column had a gravity of about 41.50° API. Thereafter, the gravity continued to decrease slowly until at 6.8 liters the gravity of the material passing from the column had dropped to 40.0° API. From this point the gravity dropped rapidly to about 20° API when 11 liters of the material passed through the column. The fact that the aniline point and the gravity values remained high while the bromine number remained at zero as the first 30% of the material passed through the column indicates that the hydrocarbons so passing through the silica gel are saturated and non-aromatic in character. The fact that as the succeeding 30% of the material passed through the column the aniline point and the gravity values remained high while the bromine number rose rapidly indicated that olefinic constituents were emerging from the silica gel column but that these olefin constituents were aliphatic rather than cyclic or aromatic. The decline in the bromine number values and the rapid decline in the aniline point and gravity of the latter portion of the material emerging from the column sharply indicates a change in the character of the olefin materials thus passing from the column. This olefin material was probably complex mixtures containing cyclic and aromatic structures as well as olefin double bonds. Of the material passing through the column, the first 32.5% was rejected and the succeeding fraction up to the 60.6% portion was selected for further treatment. Thus, 28.1% of the cracked naphtha was separated from the remainder. This fraction contained about 30% unsaturated compounds. It is obvious, however, that various selections may be made of the hydrocarbons passing through the silica gel column. While in the particular example given there is rejected from the material to be treated all of the hydrocarbons exhibiting zero bromine number, all or a part of these might have been included in the product treated without any disadvantage other than they would have constituted an undesirable diluent. While the selection of the fraction was made so as to reject substantially all portions passing through the column after the bromine number had reached its maximum value, part of these fractions may be included in the material to be processed.

In order to prepare mono-phenyl alkanes from this olefin fraction and an aromatic hydrocarbon, any well-known method of alkylating aromatics may be used. Alkylation of the aromatic hydrocarbons with these olefins by means of the Friedel-Crafts type condensation catalyst may be carried out in any usual or well-known manner using only usual or known catalysts, including those previously mentioned. It is preferred to utilize hydrogen fluoride which is a particularly effective and convenient catalyst, and the process of alkylation of aromatic hydrocarbons by these olefins may therefore be carried on by the process more fully disclosed in the Tinker and Weinmayr U. S. Patent No. 2,275,312. We have found that in the alkylation of an aromatic hydrocarbon with the olefinic constituents of cracked petroleum fractions, a very significant difference is observed, depending upon whether the olefinic constituents used are first subjected to separation by such a silica gel adsorption operation or whether the entire cracked petroleum fractions or naphthas are utilized in the process. In order to illustrate this difference, one portion of the cracked petroleum fraction was processed without any separation by silica gel adsorption in substantially the same manner as we processed the fraction thus separated by silica gel adsorption. The alkylation treatment was carried out in a continuous alkylation unit by pumping continuously a mixture of the olefinic material and benzene into a batch of agitated hydrogen fluoride until the desired amount of feed had been added. In the example of the invention, about 70 parts of benzene were mixed with about 30 parts of the olefinic material to be processed. The ratio, however, of benzene to olefinic material is not critical and may vary over wide limits, although the amount given is found preferable to insure complete alkylation in a short period of treatment at the temperatures given. A temperature of 100° F. was selected as a suitable temperature of treatment. After the treatment, the product is subjected to distillation to separate the produced phenyl alkane fraction from the remainder of the material. When the olefin fraction utilized in the alkylation procedure had been separated by the silica gel adsorption treatment, there was obtained about one volume of phenyl alkane per volume of olefin material alkylated. Where the original 350° F. to 500° F. cracked naphtha was used as a source of olefinic material, only about .36 volume of distilled phenyl alkane was obtained per volume of olefin charged. The total yield of phenyl alkane per volume of original 350° F. to 500° F. cracked naphtha used was about the same whether the entire cracked naphtha was processed or whether only the 28.1% fraction thereof obtained by the silica gel adsorption treatment was processed. The consumption of benzene per volume of distilled phenyl alkane product obtained was .457 where the silica gel adsorption treatment was included, and 1.55 where this treatment was omitted.

These results illustrate a very great improvement arising from the separation of the olefinic constituents of cracked naphtha before alkylation. The fact that the yield on the entire process is about the same in both cases indicates that the olefinic material rejected for treatment by the silica gel adsorption process, if included in the treatment, merely degrades so as to produce reaction products with benzene of low boiling point which are therefore separated from the desired product on the redistillation operation. Not only is the reactor occupied with an appreciable volume of this material where the silica gel adsorption is omitted, but also a much greater distillation load is placed upon the still required to separate such low boiling material from the product. A still more important factor is the great waste of the valuable aromatic hydrocarbon which is caused by the presence of this unstable olefinic material, and this waste is eliminated by its removal by the silica gel adsorption. Over three times as much benzene was consumed where the silica gel separation was omitted in order to make the same quantity of phenyl alkane as produced when this step was included.

Moreover, the phenyl alkanes produced by the two treatments are not the same and show definite differences in the quality of the detergent products produced by the subsequent sulfonation reaction. To illustrate this, we sulfonated each of the distilled phenyl alkanes produced as above described under identical conditions. This sulfonating step may be carried out in any usual or preferred manner. Generally, the sulfuric acid used should be at least 98% in strength and preferably 20% fuming sulfuric acid is used. To obtain rapid reaction it is preferable to use about 3 moles of fuming sulfuric acid per mole of hydrocarbon, but lower ratios and higher ratios may be employed. Various temperatures may be employed, although temperatures much higher than about 140° F. have the disadvantage that they may affect the color of the produced product. Temperatures lower than about 110° F. result in prolonged reaction times. In the particular examples given, a temperature of 130° F. to 140° F. was utilized. After treatment, which was carried on with sufficient agitation, the resulting product, which consisted mainly of sulfonic acids mixed with sulfuric acids, is then neutralized, for example, with sodium hydroxide, to produce a mixture of sodium sulfonates and sodium sulfate. In general, sodium sulfate is desirable in a detergent for certain purposes, the particular percentage thereof varying with the particular use in question. In this example of the invention adjustment was made of the ratio of sulfonate to sulfate to 40:60.

A 1% solution of each product in distilled water was then prepared and the colors determined by the Saybolt method. The product prepared using the silica gel adsorption treatment had a color value of +14 on the Saybolt scale, whereas the product prepared using the whole 350° F. to 500° F. cracked naphtha fraction had a color value of only +2.

Each of the sulfonated phenyl alkane detergents produced as described were tested for efficiency as detergents for cotton in a Launder-O-Meter. The tests were made at a concentration of 0.2% of each detergent in 300 p. p. m. hard water. In this test, artificially soiled cloths are washed in a standard manner and the soil removal determined by the change in light reflection of the cloth. A standard detergent sample is also run for comparison and the results are expressed in terms of the efficiency of this material set at 100. The following values were obtained:

| | Rating |
|---|---|
| Standard detergent sample | 100 |
| Sulfonated phenyl alkane detergent prepared from 350–500° F. fraction of cracked naphtha | 88 |
| Sulfonated phenyl alkane detergent prepared from aliphatic olefin fraction separated by silica gel adsorption from 350–500° F. cracked naphtha | 110 |

In this example of the invention, the detergent materials produced were mono-phenyl alkanes in which the alkane portion of the molecules contains between 12 and 15 carbon atoms. Where the fraction of cracked naphtha selected for treatment has a boiling point within the range of 300° F. to 600° F., products are produced by the process of this invention in which the alkane portion may have carbon atoms from 8 to 20. Substantially similar results are obtained when in place of silica gel as the adsorbent any other adsorbent, such as, for example, silica-alumina or charcoal, are employed. It is found that such other adsorbents each possesses the property of differentiating between hydrocarbons present in cracked petroleum naphtha so that the first portions coming through the adsorbent are the least polar constituents. By the use of such other adsorbents the first portion passing through the adsorbent, just as in the case of the use of silica gel, will be principally paraffinic material, after which the desirable olefinic fraction will be obtained, the cyclic and aromatic structure compounds, as well as the olefinic double bond constituents, being more strongly retained and therefore being derived from the adsorbent after the paraffins and desirable olefinic materials. Moreover, in the process of the present invention the adsorbent treatment may be carried out by the addition of a diluent or an eluant. The diluent added may be, for example, a lower boiling point oil, which may be readily separated from the desired olefin fraction after treatment. The use of such a diluent may serve the function of reducing the viscosity of the cracked petroleum fraction to be subjected to the adsorption treatment, so as to facilitate its movement through the adsorbent bed. Moreover, after the desired olefin fractions have been obtained from the adsorbent towards the end of the operation, the remaining most polar constituents may be removed from the adsorbent by passing through the column another suitable material or stripping agent, so that the adsorbing column may be conditioned for further treatment of the cracked petroleum fraction. It is not necessary that such stripping agent be entirely removed from the adsorbent before the next operation as the adsorbent may be wet with the stripping agent at the beginning of the operation.

While the particular example of the invention hereinabove described is well adapted to carry out the objects of the invention, it is obvious that various modifications and variations may be made, and this invention includes all such modifications and variations as come within the scope of the appended claims.

I claim:

1. A process for preparation of a sulfonated phenyl alkane detergent, which comprises subjecting a cracked petroleum oil fraction boiling under normal pressure between 300° F. and 600° F. to silica gel adsorption treatment by passing said fraction through a column of silica gel, rejecting from a fraction selected for further treatment the portion passing from the silica gel adsorption having zero bromine number and also rejecting from the fraction selected for further treatment the portion passing from the silica gel adsorbent obtained after the bromine number has passed the maximum value on treatment, alkylating benzene with the fraction so selected to form a phenyl alkane, and sulfonating said phenyl alkane.

2. A process for preparation of a sulfonated phenyl alkane detergent, which comprises subjecting a cracked petroleum oil fraction boiling under normal pressure between 350° F. to 500° F. to silica gel adsorption treatment by passing said fraction through a column of silica gel, rejecting from a fraction selected for further treatment the portion passing from the silica gel adsorption having zero bromine number and also rejecting from the fraction selected for further treatment the portion passing from the silica gel adsorbent obtained after the bromine number has passed the maximum value on treatment, alkylating benzene with the fraction so selected to form a phenyl alkane, and sulfonating said phenyl alkane.

3. A process of producing a sulfonated phenyl alkane detergent from an olefinic cracked petroleum oil fraction boiling under normal pressure between 300° F. and 600° F., a part of the olefinic hydrocarbons of said mixture being relatively unstable and subject to fragmentation under alkylation conditions and a part being substantially stable to fragmentation under said conditions, said process comprising removing unstable olefins of said mixture by passing said mixture through a mass of silica gel adsorbent, separating from said adsorbent a portion of said petroleum oil fraction containing said relatively stable olefins from the more strongly retained relatively unstable olefinic constituents on said adsorbent by separately recovering that fraction of the oil which flows from the adsorbent mass prior to the time when the bromine number of the effluent oil is at approximately its maximum value, alkylating benzene with said separated fraction to form a phenyl alkane, and sulfonating said phenyl alkane.

4. A process as defined in claim 3 wherein said olefinic cracked petroleum hydrocarbon fraction boils under normal pressure between 350° F. and 500° F.

5. In a process for the production of a sulfonated phenyl alkane detergent, the improvement comprising the steps of passing a cracked petroleum naphtha through a mass of a solid adsorbent conforming substantially to silica gel in its adsorptive properties to separate an adsorbate and a percolate, segregating the fraction of the percolate which has flowed from the adsorbent mass when the bromine number of the effluent percolate is at approximately its maximum value and alkylating a mononuclear aromatic hydrocarbon with at least a portion of said segregated fraction.

6. The method as defined in claim 5, wherein the cracked petroleum naphtha boils in the range about 300° F. to 600° F.

7. The method as defined in claim 6, wherein the mononuclear aromatic hydrocarbon is benzene.

WILLIAM H. CLAUSSEN.

REFERENCES CITED

The following references are of record in the file of this patent:

UNITED STATES PATENTS

| Number | Name | Date |
|---|---|---|
| 2,398,101 | Lipkin | Apr. 9, 1936 |
| 2,106,071 | Stanton | Jan. 18, 1938 |
| 2,161,173 | Kyrides | June 6, 1939 |
| 2,232,117 | Kyrides | Feb. 18, 1941 |
| 2,260,617 | Hancock | Oct. 28, 1941 |
| 2,422,627 | Martin et al. | June 17, 1947 |

OTHER REFERENCES

Mair et al.: J. Res. Nat. Bureau of Standards, vol. 15, pp. 51–62 (1935).

Mair et al.: J. Res. Nat. Bureau of Standards, vol. 32, pp. 151–164, 165–183 (1943).

Suter: "Organic Chemistry of Sulfur," Wiley & Sons, New York, N. Y., 1944, page 206.

Mair: J. Res. Nat. Bureau of Standards, vol. 34, pp. 435–451 (1945).

Hirschel et al.: Ind. Eng. Chem., vol. 39, December 1947, pp. 1585–1596. (Presented before Div. of Petroleum Chem. at 111th Meeting of A. C. S. Atlantic City, April 14 to 18, 1947, Abstract p3-0.)